United States Patent
Fitzpatrick et al.

(10) Patent No.: US 9,013,573 B2
(45) Date of Patent: Apr. 21, 2015

(54) KNOWLEDGE CAPTURE AND SHARING FOR EXPLORATION AND PRODUCTION TOOL SESSIONS

(75) Inventors: Anthony Fitzpatrick, Old Boars Hill (GB); Lisa Miriah Ashcroft, Spicewood, TX (US); Patrick Daniel Dineen, Katy, TX (US); Floyd Louis Broussard, III, The Woodlands, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 782 days.

(21) Appl. No.: 13/214,733

(22) Filed: Aug. 22, 2011

(65) Prior Publication Data

US 2012/0050521 A1 Mar. 1, 2012

Related U.S. Application Data

(60) Provisional application No. 61/379,054, filed on Sep. 1, 2010.

(51) Int. Cl.
*H04N 7/18* (2006.01)
*G01V 99/00* (2009.01)
*G01V 1/30* (2006.01)

(52) U.S. Cl.
CPC .. *G01V 99/00* (2013.01); *G01V 1/30* (2013.01)

(58) Field of Classification Search
None
See application file for complete search history.

(56) References Cited

U.S. PATENT DOCUMENTS

| | | | | |
|---|---|---|---|---|
| 5,717,869 A | * | 2/1998 | Moran et al. | 715/716 |
| 2004/0193428 A1 | * | 9/2004 | Fruchter et al. | 704/276 |
| 2006/0089820 A1 | * | 4/2006 | Yu et al. | 702/186 |
| 2006/0218563 A1 | * | 9/2006 | Grinstein et al. | 719/328 |
| 2008/0243749 A1 | * | 10/2008 | Pepper et al. | 706/47 |
| 2009/0273672 A1 | * | 11/2009 | Koudritski | 348/148 |
| 2010/0287161 A1 | * | 11/2010 | Naqvi | 707/740 |

* cited by examiner

*Primary Examiner* — Christopher S Kelley
*Assistant Examiner* — Kaitlin A Retallick

(57) ABSTRACT

A method for knowledge capture of exploration and production (E&P) tool sessions, including performing, using an E&P tool configured on a computer system, a first E&P tool session based on a subterranean formation field data set, recording a video capture of a plurality of scenes generated by the E&P tool and displayed during the first E&P tool session, capturing a description associated with a first scene of the plurality of scenes, wherein the first scene is assigned a time stamp corresponding to a specific point in time of a time line of the video capture, tagging the description with the time stamp included in a log of the video capture, and storing the video capture and the log of the video capture, wherein the description is synchronized with the specific point in time of the first scene based on the time stamp.

30 Claims, 9 Drawing Sheets

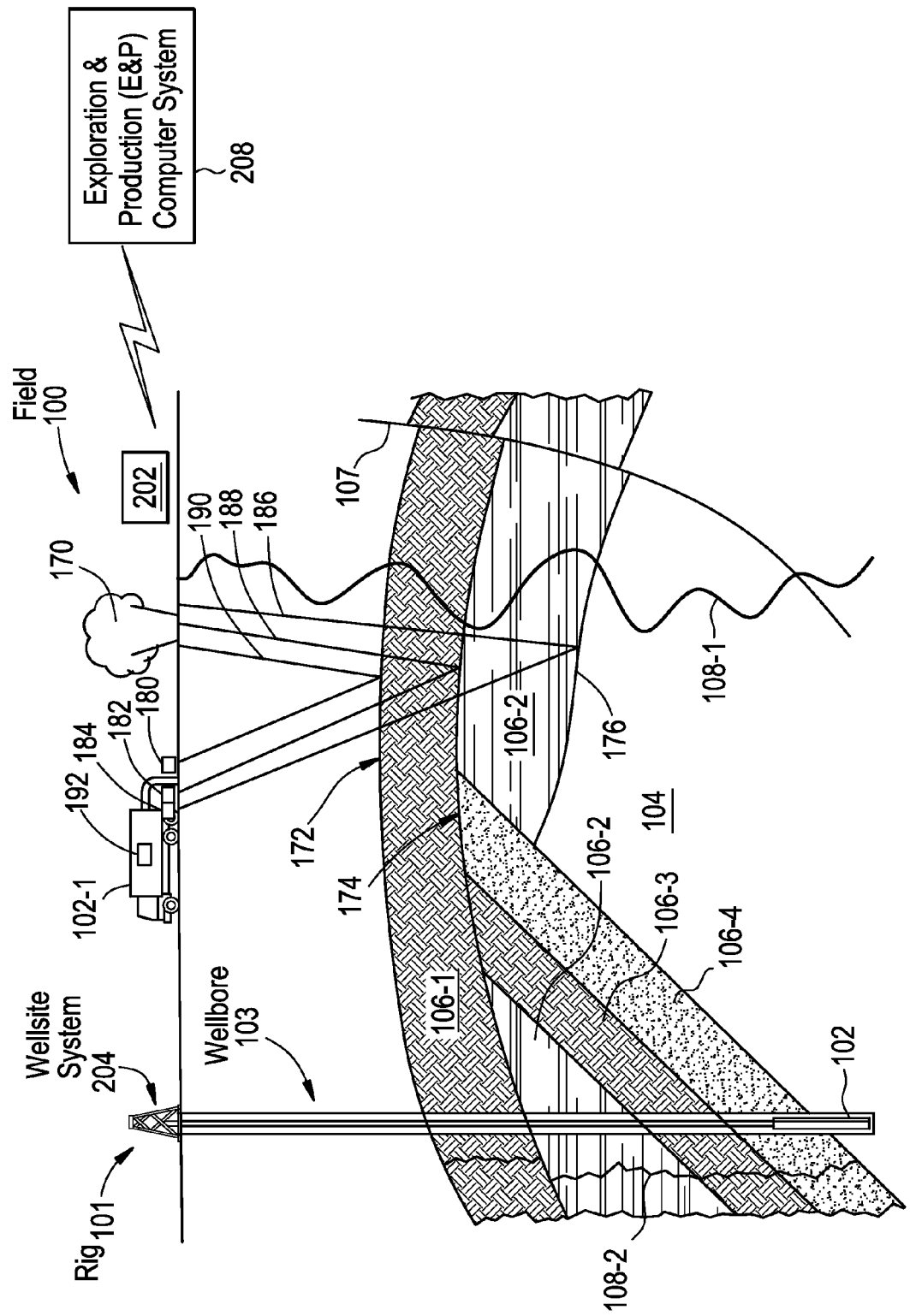
FIG. 1.1

FIG. 1.2
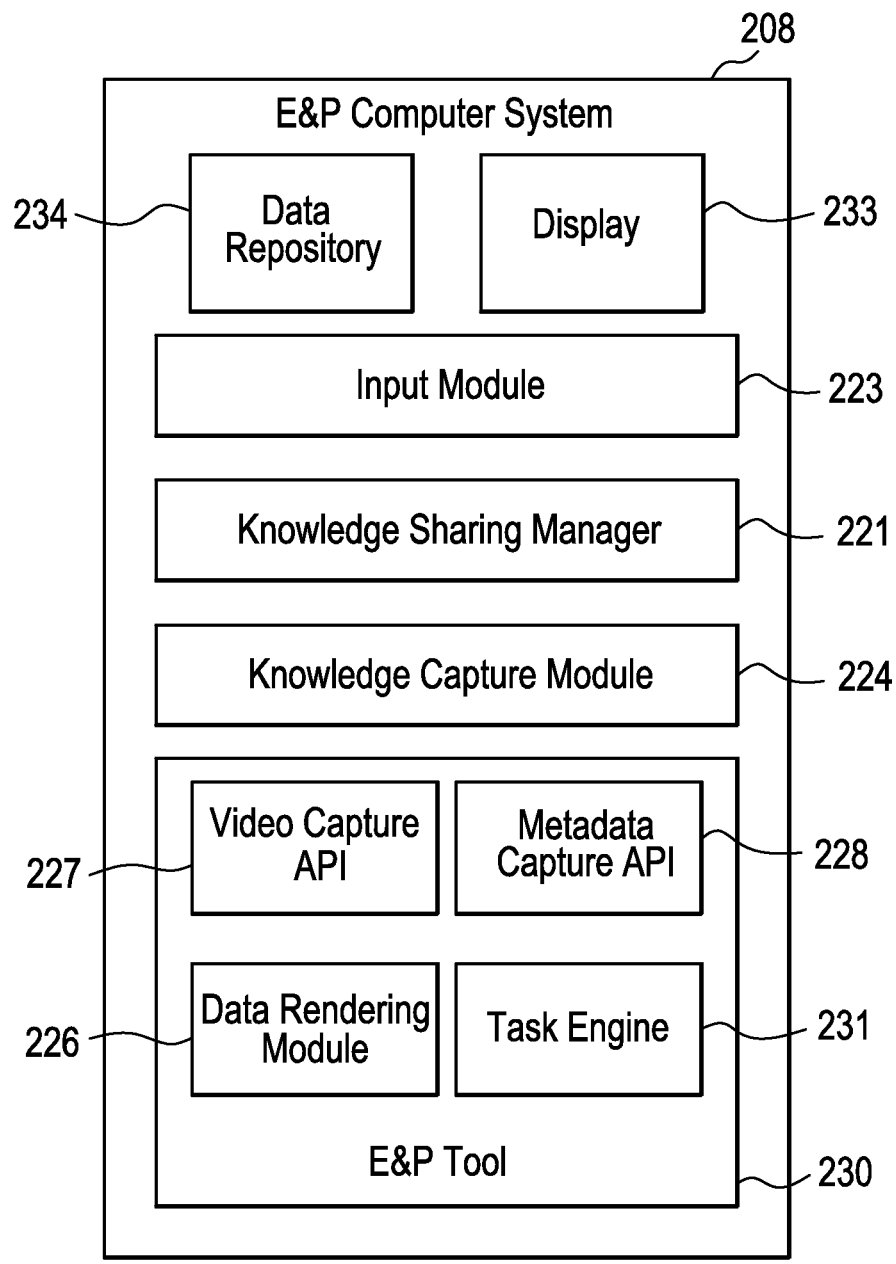

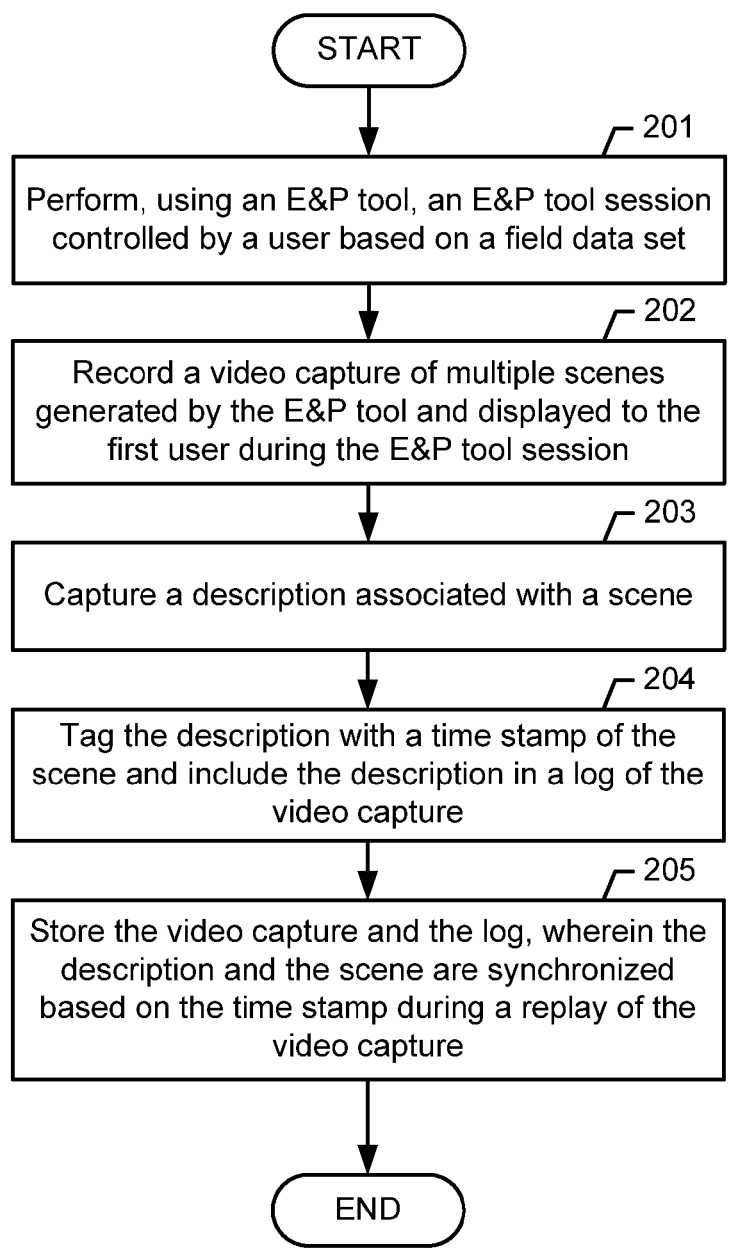
FIG. 2.1

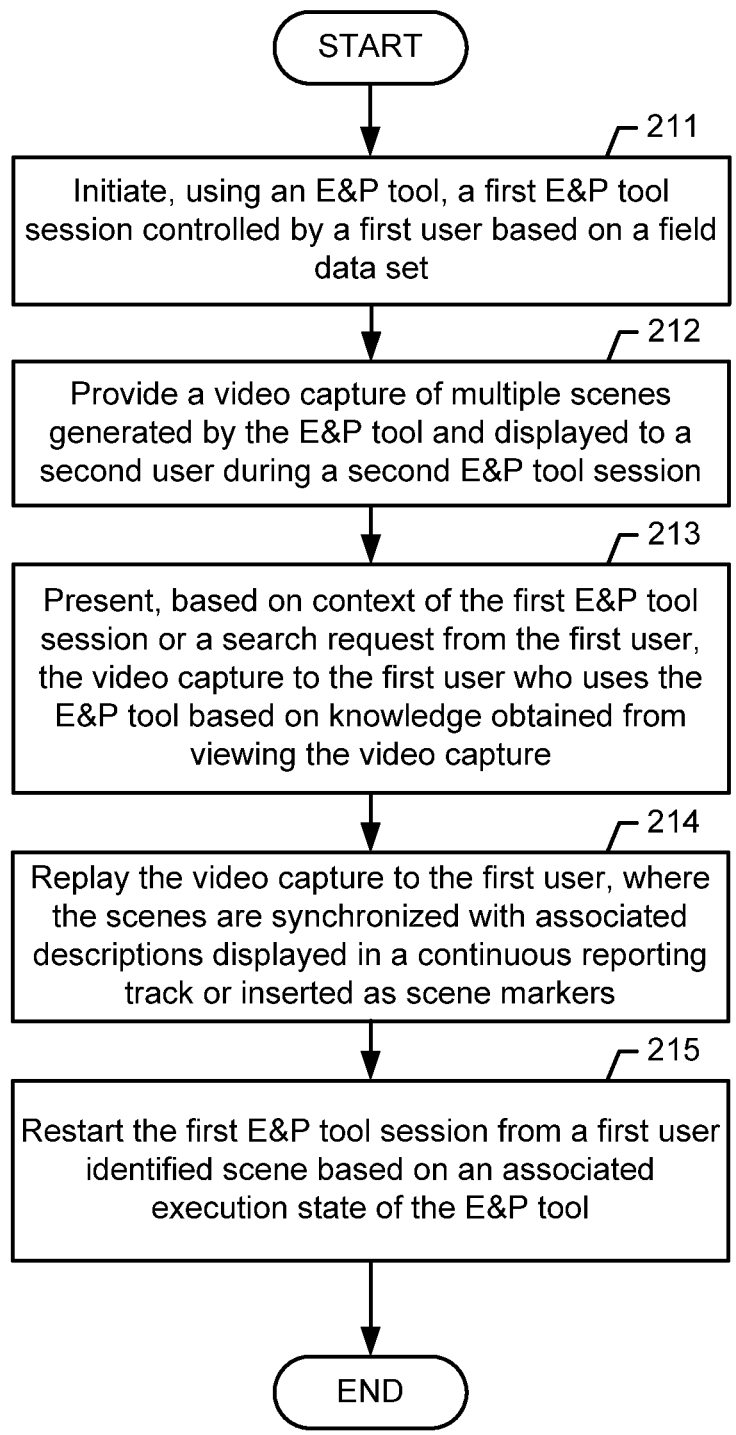
FIG. 2.2

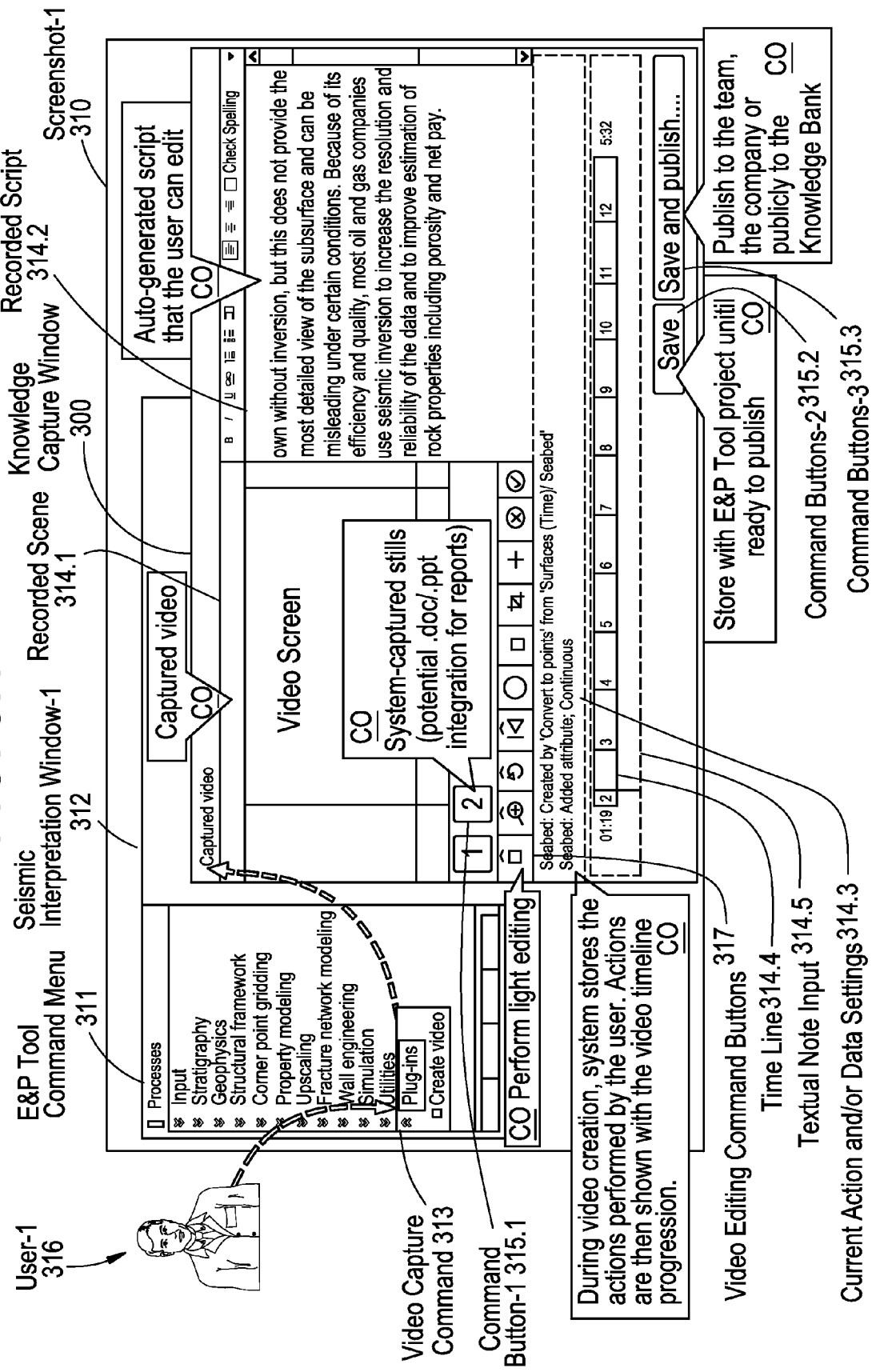
FIG. 3.1

FIG. 3.2

Screenshot-2 320

E&P Tool Window-2 321

User-2 324: Doing seismic interpretation and wants to know what info is out there about seismic interpretation that may be of use  CO Clicks the Knowledge source  CO CO  System returns all relevant content from many sources (both internal and external)

Contributor  Content title and snippet  322 Command Button-4  Content type

Andres V.
Schlumberger
Geophysics export
77 submittals
★★★★

New interpretation techniques with E&P Tool  Knowledge video  323.1
This video will highlight how our company can enhance our interpretation techniques by using the latest interpretation features offered in E&P Tool CO  User submitted & rated content to from a Knowledge source E&P Tool provided  Guided workflow on performing seismic simulation  Guided workflow  323.2
All you need to know about how to perform seismic interpretation in E&P Tool This workflow will guide you through the steps to perform CO  Could come from E&P Tool training material, part of a Skin guided workflow, etc.

E&P Tool store  -Geophysics  E&P Tool plug-in  323.3
The focus is to provide E&P Tool users with functionality features making it easier and faster to do seismic interpretation. This also involves data QC and analysis of your seismic CO  Direct info/advertisement on E&P Tool plug-ins that the user may want E&P Tool  Studio provides the method of aggregating the content and presenting it to the user (not intending to create the content)  CO Knowledge Sharing Window-1 323

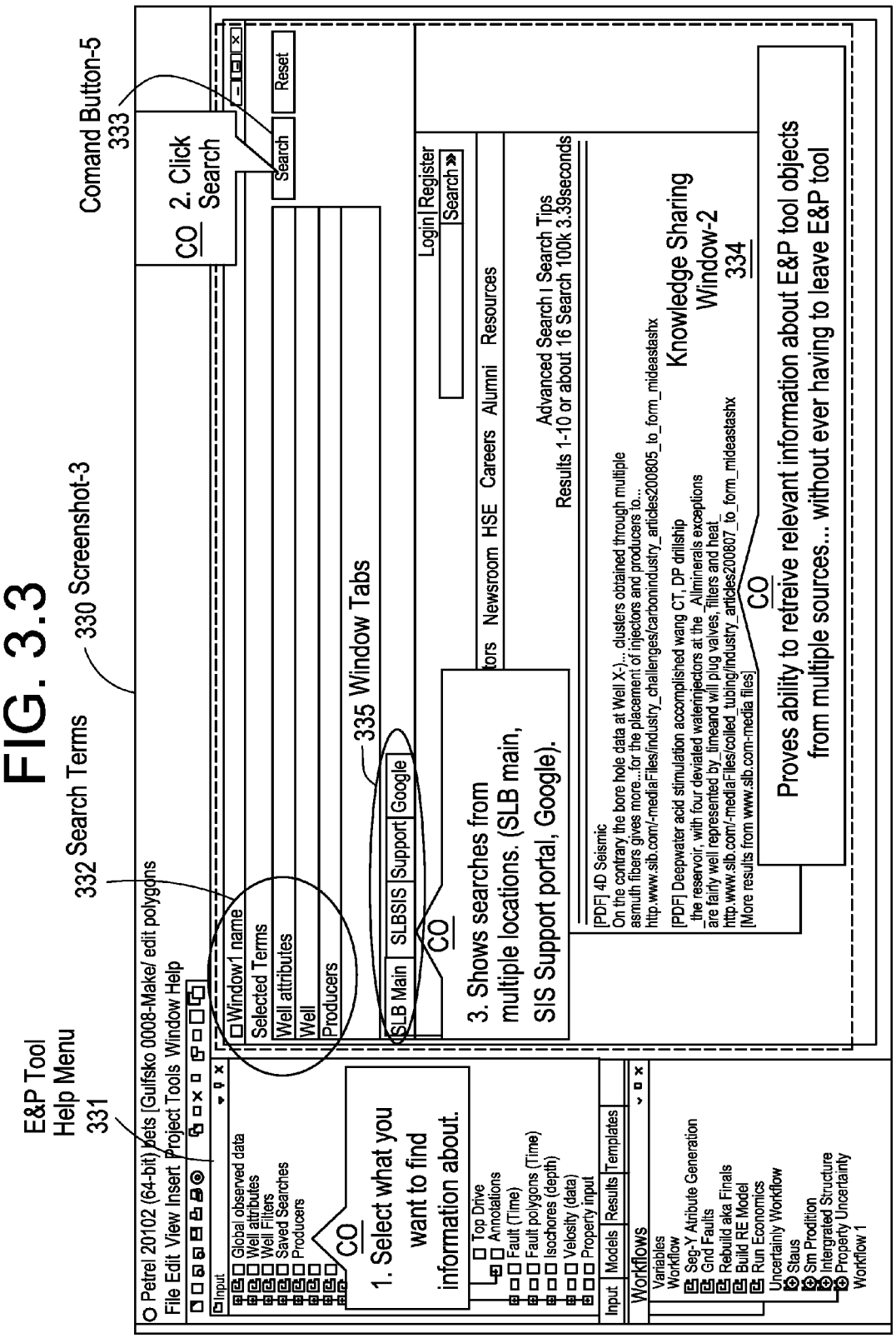
FIG. 3.3

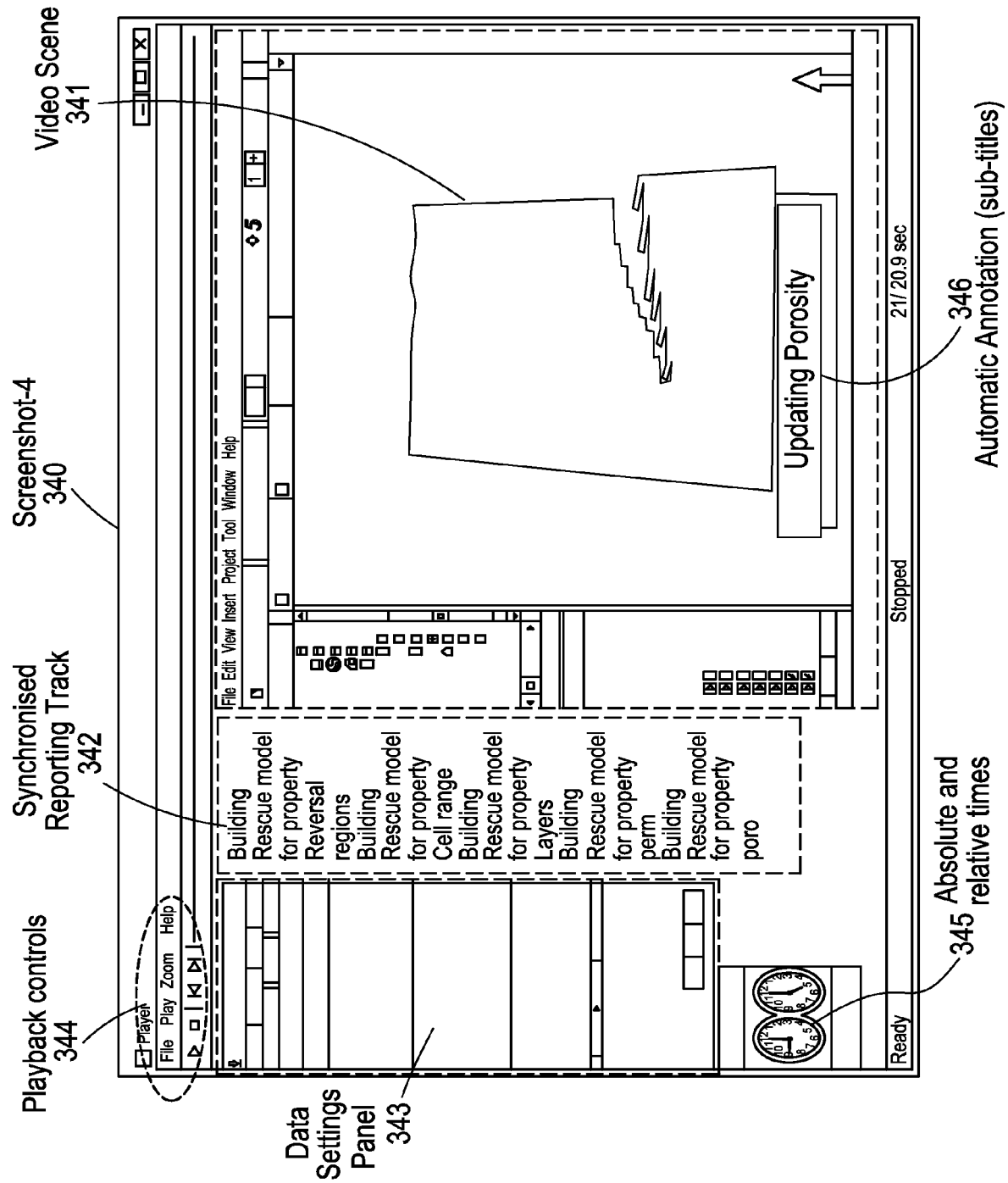
FIG. 3.4

KNOWLEDGE CAPTURE AND SHARING FOR EXPLORATION AND PRODUCTION TOOL SESSIONS

CROSS-REFERENCE TO RELATED APPLICATIONS

This application claims benefit under 35 U.S.C. §119(e) of U.S. Provisional Patent Application No. 61/379,054, filed on Sep. 1, 2010, and entitled "VIDEO PLAYBACK OF SEISMIC-TO-SIMULATION SESSIONS," which is hereby incorporated by reference.

BACKGROUND

Operations, such as geophysical surveying, drilling, logging, well completion, and production, are typically performed to locate and gather valuable downhole fluids. Surveys are often performed using acquisition methodologies, such as seismic mapping, resistivity mapping, etc. to generate images of underground formations. These formations are often analyzed to determine the presence of subterranean assets, such as valuable fluids or minerals, or to determine if the formations have characteristics suitable for storing fluids. Although the subterranean assets are not limited to hydrocarbons such as oil, throughout this document, the terms "oilfield" and "oilfield operation" may be used interchangeably with the terms "field" and "field operation" to refer to a site where any types of valuable fluids or minerals can be found and the activities required to extract them. The terms may also refer to sites where substances are deposited or stored by injecting them into the surface using boreholes and the operations associated with this process. Further, the term "field operation" refers to a field operation associated with a field, including activities related to field planning, wellbore drilling, wellbore completion, and/or production using the wellbore.

Models of subsurface hydrocarbon reservoirs and oil wells are often used in simulation (e.g., in modeling oil well behavior) to increase yields and to accelerate and/or enhance production from oil wells. Seismic interpretation tools and seismic-to-simulation programs, such as PETREL® (a registered trademark of Schlumberger Technology Corporation, Houston, Tex.), can include numerous functionalities and apply complex techniques across many aspects of modeling and simulating. Such programs typically include a large suite of tools and different programs. Users of such systems may spend many hours per day working with these tools in an effort to optimize geological interpretations and reservoir engineering development scenarios.

SUMMARY

In general, in one aspect, the invention relates to a method for knowledge capture of exploration and production (E&P) tool sessions. The method includes performing, using an E&P tool configured on a computer system, a first E&P tool session based on a subterranean formation field data set, recording a video capture of a plurality of scenes generated by the E&P tool and displayed during the first E&P tool session, capturing a description associated with a first scene of the plurality of scenes, wherein the first scene is assigned a time stamp corresponding to a specific point in time of a time line of the video capture, tagging the description with the time stamp included in a log of the video capture, and storing the video capture and the log of the video capture, wherein the description is synchronized with the specific point in time of the first scene based on the time stamp.

Other aspects of knowledge capture and sharing of exploration and production tool sessions will be apparent from the following description and the appended claims.

BRIEF DESCRIPTION OF DRAWINGS

The appended drawings illustrate several embodiments of knowledge capture and sharing of exploration and production tool sessions and are not to be considered limiting of its scope, for knowledge capture and sharing of exploration and production tool sessions may admit to other equally effective embodiments.

FIG. 1.1 is a schematic view, partially in cross-section, of a field in which one or more embodiments of knowledge capture and sharing of exploration and production tool sessions may be implemented.

FIG. 1.2 shows an exploration and production modeling tool in accordance with one or more embodiments.

FIGS. 2.1 and 2.2 depict an example method for knowledge capture and sharing of exploration and production tool sessions in accordance with one or more embodiments.

FIGS. 3.1-3.4 depict an example for knowledge capture and sharing of exploration and production tool sessions in accordance with one or more embodiments.

DETAILED DESCRIPTION

Figure 4:
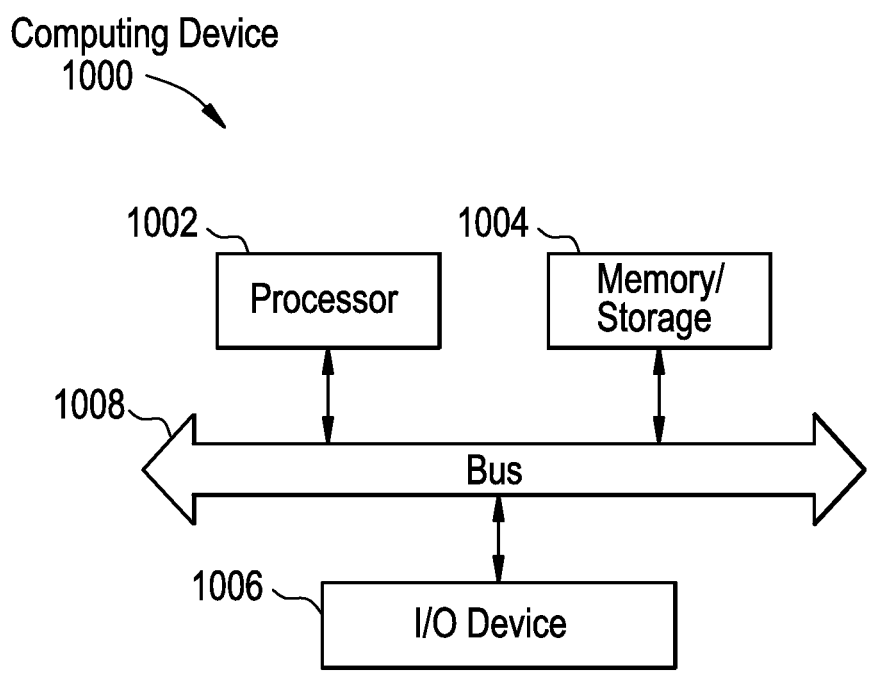
FIG. 4 depicts a computer system using which one or more embodiments of knowledge capture and sharing of exploration and production tool sessions may be implemented.

Embodiments are shown in the above-identified drawings and described below. In describing the embodiments, like or identical reference numerals are used to identify common or similar elements. The drawings are not necessarily to scale and certain features may be shown exaggerated in scale or in schematic in the interest of clarity and conciseness.

Embodiments of the present disclosure include a method, system, and computer readable medium for knowledge capture and sharing of exploration and production (E&P) tool sessions among users of an E&P tool. Example systems and methods described herein enable these users to browse through previous E&P tool sessions recorded by themselves or others. The ability to playback past tool sessions can assist a user with determining how the user previously arrived at a particular conclusion. Moreover, the example systems and methods can be used as a mechanism to disseminate knowledge among a community of users, e.g., within the E&P technical community.

In one or more embodiments, the system uses recording and voice recognition technology to generate an annotated video capture of the use of seismic interpretation tools and suites. This annotated video capture can be used to share the experience of using the seismic interpretation tools and suites. In one or more embodiments, the system uses application software recording tools and functionality to annotate the video capture with scene markers and a "Reporting Track." For example, this track may contain detailed information about the oilfield objects that were being operated on at the time the video scenes or frames were being captured for recording. An example system enables the video capture to be stored alongside the seismic interpretation database and then played, paused and rewound by the user from, e.g., within seismic interpretation software.

In one or more embodiments, the system synchronizes the video capture stream showing visual content in one or more E&P tool session windows with a supplemental reporting stream that echoes current key parameter settings used by the E&P tool. In the playback mode there can be a split-screen viewer to show multiple streams (e.g., the video capture stream and the supplemental reporting stream) simultaneously. The supplemental reporting stream may be captured at a higher frequency (e.g., higher capacity; frame rate) than the video capture stream since much more textual information and other information may be available for capture in the supplemental reporting stream, which can be played back in "slow motion."

In one or more embodiments, the system enables automatic injection of annotations into the video capture, e.g., in the form of sub-titles, scene/chapter markers, or data panels. This annotation can also be directed to off-screen video buffers so that the annotations may be selectively visible/invisible to the user during normal operation of the E&P tool and optionally viewed during playback mode.

FIG. 1.1 depicts a schematic view, partially in cross section, of a field (100) in which one or more embodiments of knowledge capture and sharing of exploration and production tool sessions may be implemented. In one or more embodiments, one or more of the modules and elements shown in FIG. 1.1 may be omitted, repeated, and/or substituted. Accordingly, embodiments of knowledge capture and sharing of exploration and production tool sessions should not be considered limited to the specific arrangements of modules shown in FIG. 1.1.

As shown in FIG. 1.1, the subterranean formation (104) includes several geological structures (106-1 through 106-4). As shown, the formation has a sandstone layer (106-1), a limestone layer (106-2), a shale layer (106-3), and a sand layer (106-4). A fault line (107) extends through the formation. In one or more embodiments, various survey tools and/or data acquisition tools are adapted to measure the formation and detect the characteristics of the geological structures of the formation.

As shown in FIG. 1.1, seismic truck (102-1) represents a survey tool that is adapted to measure properties of the subterranean formation in a seismic survey operation based on sound vibrations. One such sound vibration (e.g., 186, 188, 190) generated by a source (170) reflects off a plurality of horizons (e.g., 172, 174, 176) in the subterranean formation (104). Each of the sound vibrations (e.g., 186, 188, 190) are received by one or more sensors (e.g., 180, 182, 184), such as geophone-receivers, situated on the earth's surface. The geophones produce electrical output signals, which may be transmitted, for example, as input data to a computer (192) on the seismic truck (102-1). Responsive to the input data, the computer (192) may generate a seismic data output, which may be logged and provided to a surface unit (202) by the computer (192) for further analysis.

Further as shown in FIG. 1.1, the wellsite system (204) is associated with a rig (101), a wellbore (103), and other wellsite equipment and is configured to perform wellbore operations, such as logging, drilling, fracturing, production, or other applicable operations. Generally, survey operations and wellbore operations are referred to as field operations of the field (100). These field operations are typically performed as directed by the surface unit (202).

In one or more embodiments, the surface unit (202) is operatively coupled to the computer (192) and/or a wellsite system (204). In particular, the surface unit (202) is configured to communicate with the computer (192) and/or the data acquisition tool (102) to send commands to the computer (192) and/or the data acquisition tools (102) and to receive data therefrom. For example, the data acquisition tool (102) may be adapted for measuring downhole properties using logging-while-drilling ("LWD") tools. In one or more embodiments, surface unit (202) may be located at the wellsite system (204) and/or remote locations. The surface unit (202) may be provided with computer facilities for receiving, storing, processing, and/or analyzing data from the computer (192), the data acquisition tool (102), or other part of the field (104). The surface unit (202) may also be provided with or functionally for actuating mechanisms at the field (100). The surface unit (202) may then send command signals to the field (100) in response to data received, for example to control and/or optimize various field operations described above.

In one or more embodiments, the data received by the surface unit (202) represents characteristics of the subterranean formation (104) and may include seismic data and/or information related to porosity, saturation, permeability, natural fractures, stress magnitude and orientations, elastic properties, etc. during a drilling, fracturing, logging, or production operation of the wellbore (103) at the wellsite system (204). For example, data plot (108-1) may be a seismic two-way response time or other types of seismic measurement data. In another example, data plot (108-2) may be a wireline log, which is a measurement of a formation property as a function of depth taken by an electrically powered instrument to infer properties and make decisions about drilling and production operations. The record of the measurements, typically on a long strip of paper, may also be referred to as a log. Measurements obtained by a wireline log may include resistivity measurements obtained by a resistivity measuring tool. In yet another example, the data plot (108-2) may be a plot of a dynamic property, such as the fluid flow rate over time during production operations. Those skilled in the art will appreciate that other data may also be collected, such as, but not limited to, historical data, user inputs, economic information, other measurement data, and other parameters of interest.

In one or more embodiments, the surface unit (202) is communicatively coupled to an exploration and production (E&P) computer system (208). In one or more embodiments, the data received by the surface unit (202) may be sent to the E&P computer system (208) for further analysis. Generally, the E&P computer system (208) is configured to analyze, model, control, optimize, or perform other management tasks of the aforementioned field operations based on the data provided from the surface unit (202). In one or more embodiments, the E&P computer system (208) is provided with functionality for manipulating and analyzing the data, such as performing seismic interpretation or borehole resistivity image log interpretation to identify geological surfaces in the subterranean formation (104) or performing simulation, planning, and optimization of production operations of the wellsite system (204). In one or more embodiments, the result generated by the E&P computer system (208) may be displayed for user viewing using a 2 dimensional (2D) display, 3 dimensional (3D) display, or other suitable displays. Although the surface unit (202) is shown as separate from the E&P computer system (208) in FIG. 1.1, in other examples, the surface unit (202) and the E&P computer system (208) may also be combined.

FIG. 1.2 shows more details of the E&P computer system (208) in which one or more embodiments of knowledge capture and sharing of exploration and production tool sessions may be implemented. In one or more embodiments, one or more of the modules and elements shown in FIG. 1.2 may be omitted, repeated, and/or substituted. Accordingly, embodiments of knowledge capture and sharing of exploration and production tool sessions should not be considered limited to the specific arrangements of modules shown in FIG. 1.2.

As shown in FIG. 1.2, the E&P computer system (208) includes E&P tool (230) having task engine (231), data rendering module (226), video capture application programming interface (API) (227), and metadata capture API (228), knowledge capture module (224), knowledge sharing manager (221), input module (223), data repository (234), and display (233). Each of these elements is described below.

In one or more embodiments, the E&P computer system (208) includes the E&P tool (230) having software instructions stored in a memory and executing on a processor to communicate with the surface unit (202) for receiving data therefrom and to manage (e.g., analyze, model, control, optimize, or perform other management tasks) the aforementioned field operations based on the received data. In one or more embodiments, the received data is stored in the data repository (234) to be processed by the E&P tool (230). One or more field operation management tasks (e.g., analysis task, modeling task, control task, optimization task, etc.) may be performed in an execution pass of the E&P tool (230), referred to as an E&P tool session. During the E&P tool session, the received data is manipulated by the task engine (231) to generate, continuously or intermittently, preliminary results that are rendered and displayed to the user using the data rendering module (226) and the display (233), respectively. For example, the E&P tool session may be a seismic interpretation session where the task engine (231) processes the seismic data set and the data rendering module (226) renders interpreted seismic results to be displayed to the user using the display (233). In one or more embodiments, the display (233) may be a 2D display, a 3D display, or other suitable display device. The processor and memory of the E&P computer system (208) are not explicitly depicted in FIG. 1.2 so as not to obscure other elements of the E&P computer system (208). An example of such processor and memory is described in reference to FIG. 4 below.

In one or more embodiments, the E&P computer system (208) includes a knowledge capture module (224) configured to capture knowledge from an E&P tool session controlled by a user intending to share his/her experience using the E&P tool (230). Specifically, the knowledge capture module (224) is configured to generate a video capture of the E&P tool session by recording a scene (e.g., video scene), actions performed therein, and text description associated therewith, during the E&P tool session. Further, the knowledge capture module (224) is configured to tag the description with a time stamp for storing with the video capture in a manner that can be played back with the description synchronized to the video scene. In particular, the time stamp corresponds to a specific point in time of a time line of the video capture In one or more embodiments, the video capture includes a recording of multiple scenes generated by the E&P tool (230) and displayed to the user during the E&P tool session controlled by the user. Each of the multiple recorded scenes may include one or more frames in the video capture and is assigned a time stamp according to a time line of the video capture. For example, the time line indicates an elapse time of any single recorded frame from the beginning of the recording based on a user selectable time scale. For example, each scene may be assigned the time stamp of a leading frame in the scene. In one or more embodiments, the knowledge capture module (224) uses the video capture API (227) to capture each frame or each scene of the E&P tool session for creating the video capture. Specifically, the video capture API (227) provides functionality to deliver, at each of pre-determined recurring time intervals during the E&P tool session, an image displayed to the user by the E&P tool. In particular, resolution of such image can be user configurable up to the native screen resolution of the display (233) for providing appropriate visual details of the E&P tool session during replay. Accordingly, the knowledge capture module (224) receives such recurring images and organizes them according to the time line to form the video capture.

In one or more embodiments, one or more scenes in the video capture may be recorded with a description providing relevant information regarding the corresponding scene. The description may include an audio-video instruction provided by the user to describe an action initiated by the E&P tool during the E&P tool session, or a data setting used by the E&P tool during the E&P tool session.

In one or more embodiments, the input module (223) is configured to receive the audio-video instruction from the user to describe an event of the E&P tool session. For example, the input module (223) may include or interface with a microphone, video camera, and keyboard. Accordingly, the instruction may include portions in the form of audio description, textual description, and video description. In particular, the textual description may be manually entered or automatically converted from an audio narration of the user using voice recognition techniques. For example, the user may point to a physical object (e.g., a core sample from the subterranean formation) while narrating important aspects of the physical object relating to a particular seismic interpretation scene being displayed and recorded. While the scene on the display (233) may also be recorded using the video camera of the input module (223), in contrast to direct capture via the video capture API (227), the quality of such camera based recording, although adequate for recording user narration, may not be sufficient to deliver adequate visual details of the E&P tool session during replay.

In one or more embodiments, the knowledge capture module (224) is configured to extract other types of the description from the E&P tool (230) during the E&P tool session. As noted above, such description may include an action performed by the E&P tool (230) or a data setting used by the E&P tool (230). In one or more embodiments, the knowledge capture module (224) captures such action and/or data settings using the metadata capture API (228) from the task engine (231).

In one or more embodiments, the description is captured at a higher frequency than the video capture to allow the replay to be in a slow motion mode. Specifically, the video scene may include slow changing details while the video script typically includes higher frequency contents due to large amount of scrolling textual characters.

In one or more embodiments, the description is tagged with the time stamp assigned to corresponding video scene and is included in a log of the video capture in a synchronized manner based on the time stamp. Specifically, the description and the corresponding scene are synchronized based on the time stamp during a replay of the video capture. In one or more embodiments, the video capture and the log of the video capture are stored in the data repository (234).

The data repository (234) (and/or any of the surface unit provided data, video capture, log of the video capture, etc. stored therein) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The data repository (234) may be a device internal to the E&P computer system (208). Alternatively, the data repository (234) may be an external storage device operatively connected to the E&P computer system (208).

In one or more embodiments, the knowledge sharing manager (221) is configured to provide the video capture to another user of the E&P tool (230) such that the another user may use the E&P tool (230) based on knowledge obtained from the video capture. For example, a replay of the video capture may be viewed by another user to guide the another user in using the E&P tool (230). In one or more embodiments, the aforementioned description is extracted from the log of the video capture to annotate the corresponding scene based on the tagged time stamp for enhancing clarity of the knowledge embedded in the video capture.

In one or more embodiments, the replay of the video capture includes a continuous reporting track synchronized with the play back of recorded scenes across the time line of the video capture. In particular, the aforementioned description is displayed in the continuous reporting track to annotate the corresponding scene when the replay reaches the tagged time stamp along the time line. In one or more embodiments, the replay of the video capture includes the description as an individual scene marker marking the corresponding scene when the replay reaches the time stamp along the time line.

In one or more embodiments, the video capture is provided to another user in response to a search request from the another user during a subsequent E&P tool session controlled by the another user using the E&P tool. For example, in response to the search request, the video capture is identified based on a context of the subsequent E&P tool session when the search request is received. In another example, in response to the search request, the video capture is identified based on a search term provided by another user representing a topic regarding which the another user needs guidance. In one or more embodiments, the video capture is replayed to the another user in response to identifying the video capture.

In one or more embodiments, the knowledge sharing manager (221) is configured to allow the another user viewing the replay of the video capture to initiate a new E&P tool session from any scene selected by the viewing user. Specifically, the knowledge sharing manager (221) identifies a particular scene in the video capture, based on an input of the another user viewing the replay, to initiate the new E&P tool session. Once identified, the knowledge sharing manager (221) notifies the E&P tool (230) of the selected scene and, in response, the E&P tool (230) initiates the new E&P tool session starting from the selected scene. In one or more embodiments, the new E&P tool session is initiated based on an execution state of the E&P tool (230) associated with the selected scene. For example, the execution state includes values of all variables, states, contents of buffers, queues, and other necessary data structures sufficient to uniquely define an execution status of the E&P tool (230) and was captured while recording the selected scene during the previous E&P tool session. In one or more embodiments, the knowledge capture module (224) is configured to capture the execution state of the E&P tool (230) using the metadata capture API (228) from the task engine (231).

In one or more embodiments, two or more of the knowledge capture module (224), the knowledge sharing manager (221), and the input module (223) may be combined. In one or more embodiments, one or more of the knowledge capture module (224), the knowledge sharing manager (221), and the input module (223) may be a built-in feature of the E&P tool (230), an installed software plug-in of the E&P tool (230), or a stand alone application coupled to the E&P tool (230) via an interface.

FIGS. 2.1 and 2.2 depict an example method for knowledge capture and sharing of exploration and production tool sessions in accordance with one or more embodiments. For example, the method depicted in FIGS. 2.1 and 2.2 may be practiced using the E&P computer system (208) described in reference to FIG. 1.1 above. In one or more embodiments, one or more of the elements shown in FIGS. 2.1 and 2.2 may be omitted, repeated, and/or performed in a different order. Accordingly, embodiments of determining differential stress based on formation curvature and mechanical units should not be considered limited to the specific arrangements of elements shown in FIGS. 2.1 and 2.2.

FIG. 2.1 depicts an example method for knowledge capture during an E&P tool session. Initially in Step 201, an E&P tool session controlled by a user is performed using an E&P tool based on a field data set corresponding to characteristics of a subterranean formation. As described above, one or more field operation management tasks (e.g., analysis task, modeling task, control task, optimization task, etc.) may be performed in the E&P tool session using the E&P tool. For example, the E&P tool is provided with functionality to manipulate and analyze the field data set for performing seismic interpretation or borehole resistivity image log interpretation to identify geological surfaces in the subterranean formation or performing simulation, planning, and optimization of production operations of the wellsites in the field. During the E&P tool session, activities performed by the E&P tool are displayed to the user as a sequence of scenes corresponding to progress of the E&P tool session.

In Step 202, a video capture of a sequence of scenes generated by the E&P tool and displayed to the user during the E&P tool session is recorded. In one or more embodiments, these scenes are captured directly from the E&P tool via a video capture application programming interface (API) so as to preserve complete visual details of the activities performed by the E&P tool during the E&P tool session.

In Step 203, a description associated with a scene in the sequence is captured. In particular, the first scene is assigned a time stamp in a time line of the video capture. In one or more embodiments, the description is generated by the user to describe an event of the E&P tool session, such as the "updating porosity" event in an E&P simulation session. As described above, such user generated description may be in the format of audio description, textual description, and/or video description. In one or more embodiments, such user generated description may be captured using a microphone, camera, keyboard coupled to the E&P tool.

In one or more embodiments, the description is the description is extracted from the E&P tool via a metadata capture API. In such embodiments, the description may include an action performed by the E&P tool and/or a data setting used by the E&P tool. For example, the action may relates to a particular process launched by the E&P tool, such as the "export a rescue model that includes reverse faults and properties in the 3 D grid" process. In one or more embodiments, the aforementioned user generated description of an event and this automatically captured action may correspond to the same activity of the E&P tool. In another example, the data settings used by the E&P tool may include visualization style settings. In one or more embodiments, the description is captured at a higher frequency than the recorded video scenes to allow the replay to be in a slow motion mode. Specifically, the video scene may include slow changing details while the corresponding description typically includes higher frequency contents due to large amount of scrolling textual characters.

In Step 204, the description is tagged with the time stamp such that the description and the corresponding scene can be synchronized based on the time stamp during a replay of the video capture. In one or more embodiments, in Step 205, the tagged description is included in a log of the video capture are stored with the video capture. Subsequently, the stored video capture may be shared by another user of the E&P tool using the method shown in FIG. 3.2 below.

FIG. 2.2 depicts an example method for knowledge sharing during an E&P tool session. In one or more embodiments, the knowledge sharing depicted in FIG. 2.2 is based on the knowledge capture depicted in FIG. 2.1 above using the same E&P tool.

Initially in Step 211, a first E&P tool session controlled by a first user is performed using the E&P tool based on a field data set that may or may not be the same field data set depicted in FIG. 2.1.

In Step 212, a video capture of multiple scenes generated by the E&P tool and displayed to a second user during a second E&P tool session is provided. In particular, the second E&P tool session was performed prior to the first E&P tool session where the video capture contains knowledge of the second user that can be shared by the first user for guidance in performing the first E&P tool session. In one or more embodiments, the provided video capture was generated using the method shown in FIG. 3.1 during the second E&P tool session.

In Step 213, the video capture is presented to the first user. In one or more embodiments, the video capture is identified based on a current context of the first E&P tool session and presented to the first user automatically. For example, when the first user is performing a particular task in the E&P tool session, the video capture previously recorded during the second E&P tool session may be deemed as relevant to the particular task. Accordingly, this video capture is automatically identified and presented to the first user, for example in a pop up suggestion window overlaying the working session window of the first E&P tool session.

In one or more embodiments, the video capture is presented to the first user in response to a search request or request for help from the first user during the first E&P tool session. For example, a search term may be entered by the first user or a help menu topic may be selected by the first user in the E&P tool during the first E&P tool session. Accordingly, a knowledge database may be searched based on the search term and/or the help topic to identify the video capture previously recorded during the second E&P tool session as relevant to the need of the first user.

In Step 214, the video capture is replayed to the first user of the E&P tool. As described above, the video capture includes recorded scenes and a log of the video capture includes descriptions corresponding to the recorded scenes. In one or more embodiments, the descriptions are extracted from the log of the video capture to annotate the corresponding scenes based on the tagged time stamps.

In one or more embodiments, during the replay, the descriptions are displayed in a continuous reporting track synchronized with the replayed scenes across the time line of the video capture. Specifically, a particular description scrolls into the continuous reporting track when the replay reaches the time stamp tagged to the description as its corresponding scene is played back according to the time line of the video capture. In one or more embodiments, during the replay, a description is inserted as an individual scene marker marking its corresponding scene when the replay reaches the time stamp tagged to the description as its corresponding scene is played back according to the time line of the video capture.

In one or more embodiments, mechanisms are provided to allow the first user to use the E&P tool based on knowledge obtained from viewing the replay. For example, the first user may be able to control the first E&P tool session in a more efficient manner. In another example, the first user is allowed to select certain critical scene in the sequence of recorded scenes during the replay to restart the first E&P tool session to bypass the portion of the first E&P tool session performed prior to viewing the video capture. Such critical scene may represent a milestone in the E&P tool session where corresponding execution state of the E&P tool was captured while recording the scene previously during the second E&P tool session. In Step 215, based on the first user selected milestone scene during the replay, a new E&P tool session may be started or the first E&P session may be restarted from the first user selected scene based on the captured execution state of the E&P tool associated with the selected scene.

Additional features, systems and/or methods of knowledge capture and sharing of E&P tool sessions are further detailed below in the examples depicted in FIGS. 3.1-3.4. These additional features, systems, and/or methods represent possible implementations and are included for illustration purposes and should not be construed as limiting. Moreover, it will be understood that different implementations of knowledge capture and sharing of E&P tool sessions can include all or different subsets of aspects described below. Furthermore, the aspects described below may be included in any order, and numbers and/or letters placed before various aspects are done for ease of reading and in no way imply an order, or level of importance to their associated aspects. Additionally, the following aspects can be carried out manually, in software, firmware, logic, hardware, or any combination thereof.

In one or more embodiments, the knowledge capture may be performed by recording video capture in full screen mode to capture multiple E&P tools executing in multiple windows simultaneously or recording in single application capture mode to capture a single E&P tool executing in one of possibly multiple windows. In one or more embodiments, an automatic scene marker is placed in the log of the video capture whenever a new process of the E&P tool is opened in the E&P tool session. In one or more embodiments, the log of the video capture includes automatic streaming of settings of the E&P tool whenever an object is updated in the E&P tool session. The level of detail in the recorded settings can be controlled by the user. In one or more embodiments, the video capture may be compressed during periods of dormant activity in the E&P tool session. In one or more embodiments, sub-titles may be injected into the log of the video capture indicating a particular action of the E&P tool during the replay that is hidden during normal execution of the E&P tool. In one or more embodiments, well, property and reservoir names may be obfuscated based on user input to protect the client data. The user can also change the color look-up table in 3D to hide actual property distribution, and optionally introduce a grid transformation that distorts the model while retaining physical credibility. In one or more embodiments, the cursor or other pointer of the E&P tool can be hidden during the replay. In one or more embodiments, the complete execution state of the E&P tool is saved as each scene marker is recorded in video capture or the log of the video capture, along with the location of the saved execution state. In one or more embodiments, the recording or playback can be paused and re-started as controlled by the user.

FIGS. 3.1-3.4 depict various screenshots that further illustrate the knowledge capture and sharing of exploration and production tool sessions in accordance with one or more embodiments. Throughout FIGS. 3.1-3.3, visual call-outs are identified by the label "CO". These call-outs are optionally displayed in the user screen when the user hovers a mouse pointer over particular areas of the display for providing hints or suggested instructions.

FIG. 3.1 is an example of creating and sharing a video capture containing knowledge of using the E&P tool. As shown in FIG. 3.1, user-1 (316) is a user of an E&P tool who is creating a video capture of an E&P tool session for seismic interpretation. A shown, screenshot-1 (310) is an example screenshot of what the user-1 (316) may see during the creation of the video capture for the E&P tool session. Inside the screenshot-1 (310), E&P tool command menu (311) is a user interface menu for selecting/launching processes (e.g., input process, stratigraphy process, geophysics process, etc.) within the E&P tool. For example, the user-1 (316) may have previously launched a seismic interpretation process that generates on-going intermediate results in the seismic interpretation window-1 (312). Typically, the entire seismic interpretation process may be an interactive process controlled by the user-1 (316) and lasting an extended period of time (e.g., hours, days, etc.) depending on the complexity of the seismic data set and the experience level of the user-1 (316).

Further as shown, video capture command (313) is inserted as a software plug-in feature in the E&P tool command menu (311). The user-1 (316) has activated the video capture command (313) to launch the knowledge capture window (300), which is shown to include recorded scene (314.1), recorded script (314.2), current action and/or data settings (314.3), time line (314.4), textual note input (314.5), and various command buttons.

Specifically, the recorded scene (314.1), among a sequence of recorded scenes, is a video recording (referred to as video capture) of the seismic interpretation window-1 (312) showing a display of continuous seismic interpretation activities. The recorded scene (314.1) may include one or more video frames in the resultant video recording. The sequence of recorded scenes, or a portion thereof, may be edited during the recording or a subsequent replay, for example by user-1 (316) using video editing command buttons (317). For example, the user-1 (316) may pause the recording and skipping over unimportant portions of the lengthy interpretation process. In addition, the recorded scene (314.1) or other frame/scene in the sequence of recorded scenes may be captured into a still image using the command button-1 (315.1). For example, such captured still image may correspond to a relevant event in the seismic interpretation session and described by a corresponding portion of the recorded script (314.2). Accordingly, the captured still image and the corresponding script description may be inserted into a report of the seismic interpretation session.

The recorded script (314.2) is an automatically generated text script that is converted from a verbal narration of user-1 (316) using voice recognition techniques. The verbal narration may include a description of the continuous seismic interpretation activities displayed in the seismic interpretation window-1 (312) as well as other useful information regarding techniques or configuration settings relevant to the recorded scene (314.1). The recorded script (314.2) may be edited, for example by user-1 (316), during the recording (e.g., such as through voice commands or user input) or at a subsequent time. The recorded script (314.2) may be stored in text format or video format.

The current action and/or data settings (314.3) displays any current action (e.g., initiation or termination of a process) performed by the E&P tool and/or any current data settings (e.g., any particular seismic interpretation setting) used by the E&P tool. Such action and/or data setting may be continuously displayed in a free running manner or selectively displayed in response to a user selection. Further, such action and/or data setting, whether being displayed or hidden, may be continuously captured in a free running manner or selectively captured in response to a user interaction.

The textual note input (314.5) is a data entry field allowing user-1 (316) to enter any textual information in conjunction with or in lieu of the verbal narration. For example, the textual note may be supplemental to the recorded script (314.2) in describing the seismic interpretation activities.

For sharing purposes, key words, phrases, processes, or data used during video capture creation may be stored as metadata associated with the video capture. Advantageously, the metadata may be stored and searchable in a knowledge database such that a user specified search term or a context related to a particular process or workflow in the E&P tool session may be used to retrieve the video capture.

The time line (314.4) shows the progression of the recording based on a predefined and/or user selectable time scale. The recorded scene (314.1), a segment of the recorded script (314.2), captured current action and/or data setting (314.3), and entered textual note input (314.5) are tagged with a time stamp based on current progression of the time line (314.4) when they are recorded/captured, such that the replay of these recorded/captured information can be synchronized in separate playback streams. For example, the recorded sequence of scenes may be subsequently played back as a primary playback stream while the recorded script (314.2) may be selectively played back as a supplemental play back stream. Further, one or more of the recorded script (314.2), the captured current action and/or data setting (314.3), and the entered textual note input (314.5) may be treated as metadata of the video capture and stored as discussed above, as well as in a log of the video capture.

Once the recording and associated capturing are complete, the video capture and the log of the video capture may be saved by activating the command button-2 (315.2) so that video capture may be replayed later to the user for reference. In addition, the video capture and the log of the video capture may be saved and published by activating the command button-3 (315.3) so that video capture may be shared for replay by authorized users of the E&P tool. For example, the authorized users may be defined by the user-1 (316) or by a company policy regarding access authorization with respect to work product of the user-1 (316). For example, any team member on the same team with the user-1 (316) may be included in the authorized users.

As described above, the knowledge capture and sharing functionality may be integrated with the E&P tool as one of a built-in feature, a installed software plug-in, or a separate software application coupled with the E&P tool. Accordingly, the user-1 (316) may create the video capture without leaving the seismic interpretation session or exiting the E&P tool.

FIG. 3.2 shows an example screenshot-2 (320) of accessing a video capture containing knowledge of using the E&P tool. As shown in FIG. 3.2, another user of the E&P tool, user-2 (324), is performing seismic interpretation using the E&P tool that has generated the E&P tool window-2 (321) displaying continuous seismic interpretation activities controlled by the user-2 (324). The user-2 (324) has activated the command button-4 (322) to search for relevant expert knowledge information for guiding the seismic interpretation session. As shown, the search result is summarized in the knowledge sharing window-1 (323) having a brief description of a previously recorded knowledge video (323.1) submitted by another user (e.g., user-1 (316) depicted in FIG. 3.1) and stored in a knowledge database, a built-in guided workflow (323.2) included as embedded training material of the E&P tool, and an advertisement (323.3) of a software plug-in module that is retrieved from an online software store catalog. For example, these search results may be identified based on a current context of the seismic interpretation session when the user activates the command button-4 (322) such that the returned search results are most relevant to the current task that the user-2 (324) is working on.

As described above, the knowledge capture and sharing functionality may be integrated with the E&P tool as one of a built-in feature, an installed software plug-in, or a separate software application coupled with the E&P tool. Accordingly, the user-2 (324) may view the video capture without leaving the seismic interpretation session or exiting the E&P tool.

FIG. 3.3 shows an example screenshot-3 (330) of accessing a video capture containing data that may be instructive of how to use the E&P tool. As shown in FIG. 3.3, another user (not shown) of the E&P tool is performing seismic interpretation using the E&P tool. Embodiments of the E&P tool are configured to provide guidance on its use. As illustrated, the user has selected a particular topic or object from the E&P tool help menu (331) for relevant information specific to a current task in the seismic interpretation session. Selecting from the E&P tool help menu (331) launches the knowledge sharing window-2 (334) where the user has selected two search terms (332) (shown as highlighted) and activated the command button-5 (333) to search for relevant expert knowledge information. As shown, the search result is summarized and organized using window tabs (335) of the knowledge sharing window-2 (334). For example, different tabs allow the user to access information from different sources including a knowledge database containing previously recorded video capture, third party search engines, or other information portals.

As described above, the knowledge capture and sharing functionality may be integrated with the E&P tool as one of a built-in feature, an installed software plug-in, or a separate software application coupled with the E&P tool. Accordingly, the user may access the video capture without leaving the seismic interpretation session or exiting the E&P tool.

FIG. 3.4 shows an example screenshot-4 (340) of the video replay. As shown, the recording created by user-1 (316) shown in FIG. 3.1 is replayed to the user-2 (324) as a result of the search depicted in FIG. 3.2 or FIG. 3.3. In the screenshot-4 (340), the replay includes video scene (341) annotated with an automatic annotation (346) showing a sub-title "Updating Porosity" that describes the particular video scene (341). For example, the replayed video scene (341) may correspond to the previously recorded video scene (314.1) depicted in FIG. 3.1. In addition, the replay includes synchronized reporting track (342) displaying recorded actions of the E&P tool as well as data settings panel (343) displaying recorded data settings used by the E&P tool. Information displayed in the synchronized reporting track (342) may correspond to the current action and/or data settings (314.3) depicted in FIG. 3.1. Further, the synchronized reporting track (342) may also be used to display the recorded script (314.2) shown in FIG. 3.1 based on user configuration, such as selected using the playback controls (344). As shown, the playback controls (344) also allows starting, stopping, fast forward/reverse, zoom, etc. of the video capture. Lastly, the replay may also include the absolute and relative times panel (345) showing relevant timing information, for example corresponding to the time line (314.4) depicted in FIG. 3.1.

FIG. 4 illustrates one embodiment of a computing device (1000) that can implement the various techniques described herein, and which may be representative, in whole or in part, of the elements described herein. Computing device (1000) is only one example of a computing device and is not intended to suggest any limitation as to scope of use or functionality of the computing device and/or its possible architectures. Neither should computing device (1000) be interpreted as having any dependency or requirement relating to any one or combination of components illustrated in the example computing device (1000).

Computing device (1000) includes one or more processors or processing units (1002), one or more memory and/or storage components (1004), one or more input/output (I/O) devices (1006), and a bus (1008) that allows the various components and devices to communicate with one another. Bus (1008) represents one or more of any of several types of bus structures, including a memory bus or memory controller, a peripheral bus, an accelerated graphics port, and a processor or local bus using any of a variety of bus architectures. Bus (1008) can include wired and/or wireless buses.

Memory/storage component (1004) represents one or more computer storage media. Component (1004) can include volatile media (such as random access memory (RAM)) and/or nonvolatile media (such as read only memory (ROM), flash memory, optical disks, magnetic disks, and so forth). Component (1004) can include fixed media (e.g., RAM, ROM, a fixed hard drive, etc.) as well as removable media (e.g., a Flash memory drive, a removable hard drive, an optical disk, and so forth).

One or more input/output devices (1006) allow a user to enter commands and information to computing device (1000), and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device (1000) may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (1000) includes at least the minimal processing, input, and/or output means necessary to practice one or more embodiments.

Further, those skilled in the art will appreciate that one or more elements of the aforementioned computer device (1000) may be located at a remote location and connected to the other elements over a network. Further, one or more embodiments may be implemented on a distributed system having a plurality of nodes, where each portion of the implementation (e.g., the input module (223), the knowledge sharing manager (221), the knowledge capture module (224), the E&P tool (230), the display unit (233), the data repository (234), etc.) may be located on a different node within the distributed system. In one or more embodiments, the node corresponds to a computer system. Alternatively, the node may correspond to a processor with associated physical memory. The node may alternatively correspond to a processor with shared memory and/or resources.

The systems and methods provided relate to the acquisition of hydrocarbons from an oilfield. It will be appreciated that the same systems and methods may be used for performing subsurface operations, such as mining, water retrieval, and acquisition of other underground fluids or other geomaterials from other fields. Further, portions of the systems and methods may be implemented as software, hardware, firmware, or combinations thereof.

While knowledge capture and sharing of exploration and production tool sessions has been described with respect to a limited number of embodiments, those skilled in the art, having benefit of this disclosure, will appreciate that other embodiments may be devised which do not depart from the scope of knowledge capture and sharing of exploration and production tool sessions as disclosed herein. Accordingly, the scope of knowledge capture and sharing of exploration and production tool sessions should be limited only by the attached claims.

What is claimed is:

1. A method for knowledge capture of exploration and production (E&P) tool sessions, comprising:
   performing, using an E&P tool configured on a computer system, a first E&P tool session, wherein the E&P tool generates a plurality of preliminary analysis results during the first E&P tool session based on a subterranean formation field data set;
   recording, during the first E&P tool session, a video capture of a plurality of scenes displayed to a user during the first E&P tool session, wherein each of the plurality of scenes represents one of the plurality of preliminary analysis results displayed to the user;
   capturing a description associated with a first scene of the plurality of scenes, wherein the first scene is assigned a time stamp corresponding to a specific point in time of a time line of the video capture;
   tagging the description with the time stamp included in a log of the video capture;
   storing the video capture and the log of the video capture, wherein the description is synchronized with the specific point in time of the first scene based on the time stamp;
   replaying the video capture, wherein the description is extracted from the log of the video capture to annotate the first scene based on the time stamp; and
   displaying, during replaying the video capture, a continuous reporting track synchronized with the plurality of scenes across the time line of the video capture, wherein the description annotates the first scene in the continuous reporting track when the replay reaches the time stamp.

2. The method of claim 1,
   wherein the description describes an event of the first E&P tool session, and
   wherein the description comprises at least one description selected from a group consisting of audio description, textual description, and video description.

3. The method of claim 1,
   wherein the description is extracted from the E&P tool during the first E&P tool session, and
   wherein the description represents at least one description selected from a group consisting of an action performed by the E&P tool and a data setting used by the E&P tool.

4. The method of claim 1, wherein the first E&P tool session comprises a seismic interpretation session.

5. The method of claim 1,
   wherein the video capture is recorded using an application programming interface (API) of the E&P tool, and
   wherein the description is captured at a higher frequency than the video capture.

6. The method of claim 1, further comprising:
   receiving a search request during a second E&P tool session; and
   identifying, in response to the search request, the video capture based on at least a portion of the search request, wherein the video capture is replayed in response to identifying the video capture.

7. The method of claim 1, further comprising:
   displaying, during a replay, the description as an individual scene marker marking the first scene when the replay reaches the time stamp.

8. The method of claim 1, further comprising:
   identifying a second scene of the plurality of scenes; and
   initiating a second E&P tool session starting from the second scene based on an execution state of the E&P tool associated with the second scene.

9. The method of claim 8, further comprising:
   capturing the execution state of the E&P tool while recording the second scene during the first E&P tool session.

10. A computer system for knowledge capture of exploration and production (E&P) tool sessions of, comprising:
    a processor and memory;
    an E&P tool stored in the memory, executing on the processor, and configured to perform E&P tool sessions, wherein the E&P tool generates a plurality of preliminary analysis results during a first E&P tool session based on a subterranean formation field data set;
    a knowledge capture module stored in the memory, executing on the processor, and configured to:
       record, during the first E&P tool session, a video capture of a plurality of scenes displayed to a user during the first E&P tool session, wherein each of the plurality of scenes represents one of the plurality of preliminary analysis results displayed to the user;
       capture a description associated with a first scene of the plurality of scenes, wherein the first scene is assigned a time stamp corresponding to a specific point in time of a time line of the video capture;
       tag the description with the time stamp to be included in a log of the video capture; and
       store the video capture and the log of the video capture, wherein the description is synchronized with the specific point in time of the first scene based on the time stamp;

a knowledge sharing manager stored in the memory, executing on the processor, and configured to:
  replay the video capture, wherein the description is extracted from the log of the video capture to annotate the first scene based on the time stamp; and
  display, during replaying the video capture, a continuous reporting track synchronized with the plurality of scenes across the time line of the video capture,
  wherein the description annotates the first scene in the continuous reporting track when the replay reaches the time stamp; and
a repository configured to store the video capture and the log of the video capture.

11. The computer system of claim 10, the knowledge capture module further configured to:
  receive the description to describe an event of the first E&P tool session,
  wherein the description comprises at least one description selected from a group consisting of audio description, textual description, and video description.

12. The computer system of claim 10, the knowledge capture module further configured to:
  extract the description from the E&P tool during the first E&P tool session, and
  wherein the description represents at least one description selected from a group consisting of an action performed by the E&P tool and a data setting used by the E&P tool.

13. The computer system of claim 10, wherein the first E&P tool session comprises a seismic interpretation session.

14. The computer system of claim 10,
  wherein the video capture is recorded using an application programming interface (API) of the E&P tool, and
  wherein the description is captured at a higher frequency than the video capture.

15. The computer system of claim 10, the knowledge sharing manager further configured to:
  receive a search request during a second E&P tool session; and
  identify, in response to the search request, the video capture based on at least a portion of the search request,
  wherein replaying the video capture is replayed in response to identifying the video capture.

16. The computer system of claim 10, the knowledge sharing manager further configured to:
  display, during a replay, the description as an individual scene marker marking the first scene when the replay reaches the time stamp.

17. The computer system of claim 10,
  the knowledge sharing manager further configured to:
    identify a second scene of the plurality of scenes; and
    notify the E&P tool of the second scene,
  the E&P tool further configured to:
    initiate a second E&P tool session starting from the second scene based on an execution state of the E&P tool associated with the second scene.

18. The computer system of claim 17, the knowledge capture module further configured to:
  capture the execution state of the E&P tool while recording the second scene during the first E&P tool session.

19. A method for knowledge sharing of exploration and production (E&P) tool sessions, comprising:
  initiating, using an E&P tool configured on a computer system, a first E&P tool session for a first user; and
  providing a video capture of a second E&P tool session, wherein the E&P tool generates a plurality of preliminary analysis results during the second E&P tool session based on a subterranean formation field data set,
  wherein the video capture records, during the second E&P tool session, a first scene, among a plurality of scenes displayed to a second user during the second E&P tool session, wherein each of the plurality of scenes represents one of the plurality of preliminary analysis results displayed to the second user,
  wherein the first scene is assigned a time stamp corresponding to a specific point in time of a time line of the video capture, and
  wherein the first scene is associated with a description tagged with the time stamp and included in a log of the video capture such that the description is synchronized with the specific point in time of the first scene based on the time stamp; and
  presenting, during the first E&P tool session, the video capture to the first user by:
    replaying the video capture, wherein the description is synchronized with the specific point in time of the first scene based on the time stamp during a replay; and
    displaying, during a replay, a continuous reporting track synchronized with the plurality of scenes across the time line of the video capture,
    wherein the description annotates the first scene in the continuous reporting track when the replay reaches the time stamp.

20. The method of claim 19,
  wherein the video capture is recorded using an application programming interface (API) of the E&P tool, and
  wherein the description is captured at a higher frequency than the video capture.

21. The method of claim 19, further comprising:
  receiving a search request during the first E&P tool session; and
  identifying, in response to the search request, the video capture of the second E&P tool session based on at least a portion of the search request.

22. The method of claim 19, further comprising:
  displaying, during a replay, the description as an individual scene marker marking the first scene when the replay reaches the time stamp.

23. The method of claim 19, further comprising:
  identifying a second scene of the plurality of scenes; and
  restarting the first E&P tool session from the second scene based on an execution state of the second E&P tool that is captured while recording the second scene during the second E&P tool session.

24. The method of claim 19,
  wherein the description is generated to describe an event of the second E&P tool session, and
  wherein the description comprises at least one description selected from a group consisting of audio description, textual description, and video description.

25. The method of claim 19,
  wherein the description is extracted from the E&P tool during the second E&P tool session, and
  wherein the description represents at least one description selected from a group consisting of an action performed by the E&P tool and a data setting used by the E&P tool.

26. The method of claim 19, wherein the first E&P tool session comprises a seismic interpretation session.

27. A non-transitory computer readable medium storing instructions for knowledge capture of exploration and production (E&P) tool sessions, the instructions when executed causing a processor to:
  perform, using an E&P tool, a first E&P tool session, wherein the E&P tool generates a plurality of preliminary analysis results during the first E&P tool session based on a subterranean formation field data set;

record, during the first E&P tool session, a video capture of a plurality of scenes displayed to a user during the first E&P tool session, wherein each of the plurality of scenes represents one of the plurality of preliminary analysis results displayed to the user;

capture a description associated with a first scene of the plurality of scenes, wherein the first scene is assigned a time stamp corresponding to a specific point in time of a time line of the video capture;

tag the description with the time stamp included in a log of the video capture; and store the video capture and the log of the video capture, wherein the description is synchronized with the specific point in time of the first scene based on the time stamp;

replay the video capture, wherein the description is extracted from the log of the video capture to annotate the first scene based on the time stamp; and display, during replaying the video capture, a continuous reporting track synchronized with the plurality of scenes across the time line of the video capture, wherein the description annotates the first scene in the continuous reporting track when the replay reaches the time stamp.

28. The non-transitory computer readable medium of claim 27, the instructions when executed further causing the processor to:

replay the video capture, wherein the description is synchronized with the specific point in time of the first scene based on the time stamp during the replay.

29. A non-transitory computer readable medium storing instructions for knowledge sharing of exploration and production (E&P) tool sessions, the instructions when executed causing a processor to:

initiate, using an E&P tool, a first E&P tool session for a first user; and provide a video capture of a second E&P tool session, wherein the E&P tool generates a plurality of preliminary analysis results during the second E&P tool session based on a subterranean formation field data set, wherein the video capture records, during the second E&P tool session, a first scene, among a plurality of scenes displayed to a second user during the second E&P tool session, wherein each of the plurality of scenes represents one of the plurality of preliminary analysis results displayed to the second user, wherein the first scene is assigned a time stamp corresponding to a specific point in time of a time line of the video capture, and wherein the first scene is associated with a description tagged with the time stamp and included in a log of the video capture such that the description is synchronized with the specific point in time of the first scene based on the time stamp; and present, during the first E&P tool session, the video capture to the first user by:

replaying the video capture, wherein the description is synchronized with the specific point in time of the first scene based on the time stamp during a replay; and displaying, during the replay, a continuous reporting track synchronized with the plurality of scenes across the time line of the video capture, wherein the description annotates the first scene in the continuous reporting track when the replay reaches the time stamp.

30. The non-transitory computer readable medium of claim 29, the instructions when executed further causing the processor to:

replay the video capture to the user, wherein the description is synchronized with the specific point in time of the first scene based on the time stamp during the replay.

* * * * *